UNITED STATES PATENT OFFICE.

CHARLES H. SAKRYD AND HUBERT M. ROSENCRANS, OF CLEVELAND, OHIO, ASSIGNORS TO THE GRASSELLI CHEMICAL COMPANY, OF CLEVELAND, OHIO, A CORPORATION OF OHIO.

SUSPENDED ARSENATE OF LEAD AND METHOD OF MAKING SAME.

1,390,648. Specification of Letters Patent. Patented Sept. 13, 1921.

No Drawing. Application filed April 25, 1921. Serial No. 464,373.

*To all whom it may concern:*

Be it known that we, CHARLES H. SAKRYD and HUBERT M. ROSENCRANS, citizens of the United States, and residents of Cleveland, county of Cuyahoga, State of Ohio, have jointly invented a new and useful Improvement in Suspended Arsenate of Lead and Methods of Making Same, of which the following is a specification, the principle of the invention being herein explained and the best mode in which we have contemplated applying that principle, so as to distinguish it from other inventions.

The present invention relates to an improved arsenate of lead and to a method of making the same, and is particularly directed to an arsenate of lead possessing improved suspension qualities in water for spraying purposes, and also to a method of making such product. To the accomplishment of the foregoing and related ends, said invention, then, consists of the means hereinafter fully described and particularly pointed out in the claims.

The following description sets forth in detail one method and one product exemplifying our invention, such disclosed procedure and product constituting, however, but one of various applications of the principle of our invention.

Arsenate of lead is largely used as a spray for plants, and the value of the article in each case depends chiefly upon its ability to remain suspended in water and its covering power when sprayed onto the foliage of plants and trees. The covering power is determined by the tendency of the individual particles of arsenate of lead to agglomerate or stick together in lumps, for if this occurs, the spray when it strikes the leaves does not run over or cover the entire surface, as the small particles of lead are stuck together or remain in a single lump or in several small lumps, and do not by any means cover the entire leaf. With such an article it is necessary to use a very much larger amount of arsenate of lead to properly cover the foliage than is the case where the arsenate of lead is finely divided and the particles remain separated.

We have discovered an improved method of manufacturing arsenate of lead or of preparing arsenate of lead for use as a spray, and our improvements are of particular interest in connection with the acid lead arsenate which is the usual kind of arsenate which is today on the market and which is indicated by the formula $PbHAsO_4$. This acid lead arsenate is manufactured by the well-known process of adding arsenic acid or a soluble arsenate salt, either to oxid of lead or to a lead salt in an aqueous solution, then filter-pressing the precipitated arsenate of lead to remove the excess water. The filter-pressed product may then be sold as a paste or it may be dried in suitable apparatus or ground to provide a powder. In either case the paste or powder is mixed with water if used as a spray.

We have found that by adding to the arsenate of lead after its formation, but before it is filter-pressed, a very small amount of de-sugared molasses, which is the residue from the making of sugar from sugar beets, and then filter-pressing the mixture it is possible to produce an arsenate of lead having immensely improved suspension qualities. The action of this de-sugared molasses on the arsenate of lead is not known to us, but we have observed that when so treated the arsenate of lead remains in an extremely finely divided condition, and has a tendency to remain in suspension in water for a very protracted period as compared with the tendency of the ordinary powder to settle within a very short time, usually a few hours. When arsenate of lead which has been so treated is sprayed upon foliage it forms a very fine film which covers the foliage very much more effectively than the product obtained from the processes in the usual way. It is probable that the function of the de-sugared molasses is to cause the arsenate of lead to remain in a very finely divided condition, which accounts for its spreading and covering properties. It is essential that the arsenate of lead contain a high percentage of the acid lead arsenate over the normal lead arsenate indicated by the formula $Pb_3(AsO_4)_2$ since alkalis, bases or basic salts appear to prevent the desired action of the de-sugared molasses on the arsenate of lead. In applying our invention we use only enough residual digester liquor so that the batch containing the freshly made arsenate of lead and diluting medium will contain from .2 to .25 per cent., by weight, of digester liquor, for example—to a slurry or mixture containing 16 pounds of dry arsenate of lead and 84 pounds of water we would add from .2 to .25 pounds of digester liquor. Either smaller or larger amounts than the range mentioned will produce very beneficial results, but we find this range best adapted to our operation from an economical standpoint. Even less of the molasses remains in the finished product, as many of the substances contained in the molasses are soluble in water and are probably filter-pressed out of the mass during this operation, so that the amount of material added to the arsenate of lead is probably less than $\frac{1}{10}$ of 1 per cent.

A very much superior product can be obtained by our improved method by the action of the de-sugared molasses which probably acts as a separating or deflocculating agent to prevent agglomeration of the particles of arsenate of lead, and to maintain them in a separate and finely divided condition.

Other forms may be employed embodying the features of our invention instead of the one here explained, change being made in the form or construction, provided the elements stated by any of the following claims or the equivalent of such stated elements be employed, whether produced by our preferred method or by others embodying steps equivalent to those stated in the following claims.

We therefore particularly point out and distinctly claim as our invention.

1. In a method of increasing the suspension properties of arsenate of lead, the steps which consist in adding to acid arsenate of lead when being manufactured and before filtering, a small amount of desugared molasses and then filter-pressing the resulting mixture.

2. In a method of increasing the suspension properties of arsenate of lead, the steps which consist in adding to acid arsenate of lead when being manufactured and before filtering, a fraction of one per cent. of desugared molasses, and then filter-pressing the resulting mixture.

3. A highly suspendible arsenate of lead consisting of finely divided acid arsenate of lead containing a small amount of desugared molasses.

4. A highly suspended arsenate of lead consisting of finely divided arsenate of lead containing not more than one per cent. of desugared molasses.

Signed by us, this 13th day of April, 1921.

CHARLES H. SAKRYD.
HUBERT M. ROSENCRANS.